Patented June 12, 1945

2,377,927

UNITED STATES PATENT OFFICE 2,377,927

ROOFING COMPOUND AND PROCESS FOR MAKING SAME

Charles M. Evans, Shaker Heights, Ohio, assignor to The Master Mechanics Co., Cleveland, Ohio No Drawing. Application August 5, 1942, Serial No. 453,754

2 Claims. (Cl. 260—19)

The present invention relates to roofing compounds and to the process for making the same.

The primary object of this invention is to provide an improved product of the class mentioned which is more impervious to water, and is less likely to crack, check or otherwise deteriorate under temperature extremes than other similar products.

Another object is to provide a product which is more pliable, elastic and resilient than the prior art products.

A further object is to provide a product of the type mentioned which has a relatively high initial viscosity and which can be spread much thinner for corresponding results than the prior commercial roofing compounds.

These and other objects and advantages will become apparent from a reading of the following description and claims.

Broadly this invention consists of a combination of a bituminous blend of certain selected asphalts, a blend of certain selected resins, selected drying oil, a selected solvent for all of these and a quantity of asbestos fibres dispersed therein.

As conducive to a clearer understanding of this invention, it may be well at this point to describe the various selected materials and to briefly state their important characteristics as they relate to this improved composition. Of the asphalts used in this compound, the first is Gilsonite, which is a vitrified pure, hard natural, mineral type asphalt that has a melting point of approximately 300° Fahrenheit. This first asphalt might be termed the prime ingredient. The other natural asphalt used is a product known to trade as "Manjak" and is a special mineral type asphalt which comes from New Zealand. It is somewhat softer than the Gilsonite and has a melting point of about 200° Fahrenheit. When properly blended and mixed with the Gilsonite in proportions of about one to eight, it reduces the brittleness of the prime ingredient but does not materially lower the melting point. A liquid petroleum asphalt is also used in the second step of this process to more easily hold in suspension the asbestos fibres and to facilitate the thorough mixing of the ingredient. This petroleum asphalt is a regular commercial type of product, is also known as artificial asphalt and is economical and readily obtainable in this country.

Of the two resins used in this product, the first is para-coumarone indene, a synthetic resin. This is a coal tar product and is known to the trade as Barrett's Cumar W. The second resin used is a rosin modified phenol formaldehyde resin which is somewhat more brittle than the para-coumarone indene and is known to the trade as Reichold's P-306 Beckacite. These two resins when used in approximately equal quantities have the property of making the finished material more resilient and elastic and less likely to crack or check when ultimately used.

The drying oil used in the product is a sardine oil consisting of stearin and olein and has a boiling point of about 600° Fahrenheit. This oil is one of the drying type oils and is also readily obtainable on the domestic market.

The solvent or reducer (also referred to herein as a thinner) which is used in this product to thin or make more fluid the other ingredients is simply the V. M. & P. naphtha which is known to the trade as varnish maker's and painter's naphtha.

The asbestos fibres used are Canadian long strand strong fibres and are thus selected so as to have a somewhat uniform length and are approximately one-quarter of an inch long.

In carrying out my invention I have found it necessary, in order to effect the complete solution and the controlled polymerization of the materials, to make this product in two batches and to employ a process embodying primarily three distinct steps. The first batch of material is made in the first step of the process and combines the asphalt, the resins, the fish oil and the naphtha thinner. The second batch of material is made in the second step or simultaneously with the first step and combines and disperses the asbestos fibres with the liquid petroleum asphalt. The third step simply combines the aforesaid first two compounds in proper proportion and under certain predetermined conditions.

In the first step, a quantity of fifteen to twenty parts of the fish oil is thoroughly heated in a large kettle to a temperature of between 500° F. and 600° F., for about one hour to thoroughly dehydrate the same. Four to six parts of paracoumarone indene and four to six parts of the phenol formaldehyde resin are added to the heated oil, thoroughly dissolved and mixed therewith. Paddle stirrers are used to agitate this mixture while being dissolved and mixed for about fifteen minutes. Fifteen to twenty parts of the Gilsonite are then added to this heated and agitated mixture, and at the same time, from 1½ to 2½ parts of the "Manjak" are slowly added.

After holding the temperature and constantly stirring the same for a period of fifteen to thirty minutes, the product is rapidly cooled to about 400° F. This last solution is then thinned with about fifty parts of the aforesaid naphtha and is allowed to quickly cool to room temperature.

The "Manjak" as here used has a tendency to modify the gilsonite. I have found that too much "Manjak" has a tendency to make the final product too soft, while too little of it or none at all tends to make the final product much too hard for practical use. I have also found that the para-coumarone indene, in the quantities specified, has a tendency to similarly modify the phenol formaldehyde resin so as to obtain the desired elasticity and resiliency required for relatively thin surface coatings that might be exposed to inclement weather and extremes of climatic temperature. To completely eliminate either the para-coumarone indene or the rosin modified phenol formaldehyde resin or to substitute one for the other causes the final product to become too brittle for practical use as herein intended.

In the second step, the asbestos fibres are mixed with the liquid asphalt in proportions approximating ten percent fibres and ninety percent asphalt by volume. Finally, the aforesaid mixed liquid or artificial asphalt and the fibres obtained by the second step of the process is thoroughly mixed with the homogenized resins, mineral asphalts, oil and thinner, which was obtained by the first step in the process.

By modifying the quantities of the component material parts, and the processing periods and temperatures within relatively limited ranges, varying physical characteristics of the final product may be obtained. The desired results can be predetermined by relatively simple experiment and then the final commercial processing may thereafter be easily controlled so as to obtain the optimum characteristics or best results.

A very satisfactory product for this climate and temperature can be obtained by mixing the aforesaid material in the following proportions and in the following manner. The first batch of base material is made by heating 17.02 parts of the fish oil to 575° F. for one hour. 5.11 parts of para-coumarone indene and 5.11 parts of the phenol resin are added thereto. The solution is reheated to 575° F. and is held at that temperature for fifteen minutes. Next, 17.02 parts of the gilsonite and 2.11 parts of the "Manjak" are added to the mixture of oil and resin while it still is at the 575° F. temperature and is then allowed to cook for fifteen minutes. The homogenized product so far is then cooled to 400° F. rather rapidly so as to retard further polymerization and is then thinned with the fifty parts of a high boiling point naphtha. This thinned polymerized compound which is the base of the final composition is then permitted to slowly cool to room temperature.

The second batch of material is made by mixing and thoroughly dispersing 9.3 parts of the long asbestos fibre in 90.7 parts of the liquid petroleum asphalt at room temperature. This composition thus obtained in the second step becomes the vehicle for the base composition.

In the third step of the process I mix 10.05 parts of the base product which was prepared in the first step with 89.95 parts of the aforementioned vehicle which was prepared in the second step, to form the final product.

The base product may be added warm to the vehicle, however, I have found that excessive temperatures should be avoided in order to prevent excessive polymerization of the final product and also to avoid premature and unnecessary evaporation of the thinner. It has also been found that the fibres remain more evenly dispersed and suspended in the solution if the temperatures stated herein are closely adhered to. I have found that there is a tendency for the fibres to settle out in a hot solution while at room temperatures they remain more evenly dispersed.

Among the many advantages that this roofing compound has over those of the prior arts, I find that it has greater coherence and therefore makes a better bond with the under-surface and hence, may be more advantageously used as a resurfacing composition. This product may be applied cold and spread with a brush, thus making a more economical surfacing material than earlier, similar products.

It will now be clear that there is provided by this invention a roofing compound and process for making same which accomplishes the objects herein set forth. While the invention has been described in its preferred form and while certain special language has been used, it is to be understood that the embodiment of the invention as described, is suggestive only and is not to be considered in a limiting sense as there may be other forms or adaptations of the invention which may come within the broad scopes of the appended claims.

I claim:

1. A liquid roof surfacing compound, comprising, about one part of a resinous mixture consisting of 5.11 parts of para-coumarone indene, 5.11 parts of rosin modified phenol-formaldehyde resin, 17.02 parts of mineral asphalt having a melting point of about 300° F., 2.11 parts of mineral asphalt having a melting point of about 200° F., 17.02 parts of drying fish oil and about 50.00 parts of naphtha, and about nine parts of a bituminous mixture consisting of 90.7 parts of liquid petroleum asphalt and 9.3 parts of asbestos fibers.

2. A liquid roof surfacing compound, comprising, about one part of a resinous mixture consisting of four to six parts of para-coumarone indene, four to six parts of rosin modified phenol-formaldehyde resin, fifteen to twenty parts of mineral asphalt having a melting point of about 300° F., one and a half to two and a half parts of a mineral asphalt having a melting point of about 200° F., fifteen to twenty parts of a drying fish oil and about fifty parts of naphtha, and about nine parts of a bituminous mixture consisting of ninety and seven tenths parts of liquid petroleum asphalt and nine and three tenths parts of asbestos fibers.

CHARLES M. EVANS.